(12) United States Patent
Neuser et al.

(10) Patent No.: US 11,016,042 B2
(45) Date of Patent: May 25, 2021

(54) FAST INDUSTRIAL COMPUTED TOMOGRAPHY FOR LARGE OBJECTS

(71) Applicant: GE Sensing & Inspection Technologies, GmbH, Hürth (DE)

(72) Inventors: Eberhard Neuser, Hürth (DE); Alex Sawatzky, Hürth (DE); Nils Rothe, Hürth (DE); Alexander Suppes, Hürth (DE)

(73) Assignee: GE SENSING & INSPECTION TECHNOLOGIES, GMBH, Hurth (DE)

(*) Notice: Subject to any disclaimer, the term of this patent is extended or adjusted under 35 U.S.C. 154(b) by 0 days.

(21) Appl. No.: 16/538,821

(22) Filed: Aug. 13, 2019

(65) Prior Publication Data

US 2021/0048397 A1    Feb. 18, 2021

(51) Int. Cl.
*A61B 6/00* (2006.01)
*G01N 23/046* (2018.01)

(52) U.S. Cl.
CPC ... *G01N 23/046* (2013.01); *G01N 2223/3306* (2013.01)

(58) Field of Classification Search
CPC .............. G01N 23/046; G01N 2223/3306
See application file for complete search history.

(56) References Cited

U.S. PATENT DOCUMENTS

| | | | | |
|---|---|---|---|---|
| 4,247,774 A | * | 1/1981 | Brooks | A61B 6/032 250/367 |
| 4,599,740 A | * | 7/1986 | Cable | G01V 5/0016 378/57 |
| 6,076,400 A | * | 6/2000 | Bechwati | G06K 9/00771 73/32 R |
| 6,389,097 B1 | | 5/2002 | Bulkes et al. | |
| 7,062,006 B1 | | 6/2006 | Pelc et al. | |
| 7,545,905 B2 | | 6/2009 | Munker et al. | |

(Continued)

FOREIGN PATENT DOCUMENTS

| DE | 102005036527 A1 | 2/2007 |
|---|---|---|
| DE | 102006041850 A1 | 3/2008 |

(Continued)

OTHER PUBLICATIONS

International Search Report and Written Opinion issued in corresponding International Application No. PCT/EP2020/025359, dated Sep. 12, 2020, 12 pages.

*Primary Examiner* — Kiho Kim
(74) *Attorney, Agent, or Firm* — Mintz Levin Cohn Ferris Glovsky and Popeo, PC; Lisa Adams

(57) ABSTRACT

Systems and methods for non-destructive testing by computed tomography are provided. The system can include a stationary radiation source, a stage, and a plurality of stationary radiation detectors. The source can be configured to emit, from a focal point, a beam of penetrating radiation having a three-dimensional geometry and to direct the beam in a path incident upon a target. The stationary radiation source can be positioned with respect to the plurality of stationary radiation detectors and the stage such that, a first plurality of beam segment paths is defined between the focal point and respective sensing faces of the plurality of radiation detectors and at least one second beam segment path is defined between the focal point and a predetermined gap.

19 Claims, 8 Drawing Sheets

(56) References Cited

U.S. PATENT DOCUMENTS

| | | | |
|---|---|---|---|
| 8,837,670 B2* | 9/2014 | Akery | G01T 1/24 |
| | | | 378/57 |
| 2006/0023835 A1* | 2/2006 | Seppi | G01N 23/046 |
| | | | 378/57 |
| 2006/0291616 A1* | 12/2006 | Kitazawa | G01T 1/2985 |
| | | | 378/19 |
| 2008/0089466 A1 | 4/2008 | Munker et al. | |
| 2014/0307854 A1* | 10/2014 | Lauridsen | G01N 23/205 |
| | | | 378/73 |
| 2015/0010127 A1* | 1/2015 | Aoki | G01N 23/087 |
| | | | 378/53 |
| 2015/0110244 A1* | 4/2015 | Tsujino | G01N 23/083 |
| | | | 378/58 |
| 2017/0287173 A1 | 10/2017 | Zhang et al. | |
| 2019/0317240 A1* | 10/2019 | Chen | G01N 23/046 |

FOREIGN PATENT DOCUMENTS

| | | |
|---|---|---|
| EP | 2942649 A1 | 11/2015 |
| EP | 3208607 A1 | 8/2017 |

\* cited by examiner

FAST INDUSTRIAL COMPUTED TOMOGRAPHY FOR LARGE OBJECTS

BACKGROUND

Non-destructive testing (NDT) is a class of analytical techniques that can be used to inspect a target, without causing damage, to determine whether the inspected target meets required specifications. NDT has found wide acceptance in industries such as aerospace, power generation, oil and gas transport or refining, and transportation, that employ structures that are not easily removed from their surroundings.

Computed Tomography (CT) is one example of an NDT technique. In certain implementations, CT can provide quantitative images of material density as a function of geometry of cross-sections through the target. These cross-sectional images can be combined to produce corresponding 3-dimensional representations of the target.

SUMMARY

In some circumstances, a CT system can include a radiation source that generates penetrating radiation (e.g., X-rays), a rotatable stage, and a detector. During an inspection process, the target can be mounted to the stage and the radiation source can generate and direct radiation in a path that passes through the target at a predetermined angle (e.g., with respect to a reference angle) and is incident upon the detector, referred to as a CT projection. As the radiation travels through the target, a portion the radiant intensity (energy per unit time and per unit solid angle) can lost due to absorption and/or scattering, reducing the radiant intensity transmitted through the target as compared the amount of radiation incident upon the target. Thus, the intensity of radiation that is detected by the detector after passage through the target can be a function of the length of the path traveled by the radiation, as well as the material(s) through which the radiation passes (e.g., material composition, material density, etc.). After the detector measures the radiant intensity as a function of position for a first CT projection at a first angle, the stage can be rotated to a second angle. The second angle can be characterized with respect to the reference angle, or the first CT measurement can be used as the reference angle, and the measurement process can be repeated to characterize a second CT projection at the second angle. This sequence of CT measurement and rotation can be repeated until sufficient CT projections have been acquired to sample a desired volume of the target, up to and including the entire target, referred to as a CT scan. The detector can transmit the radiation intensity-position data acquired by the detector for the CT scan to a computing device. Subsequently, the intensity-position data can be assembled by the computing device based upon the angle of rotation of the target, the direction of the radiation beam, and a selected reconstruction methodology to provide a three-dimensional characterization of the inspected target volume. However, under some circumstances, the target, and/or the projection of the target on the detector can be larger than the detector itself (e.g., targets such as aircraft wings, turbine blades, etc.)

While techniques have been developed to increase the measurement area of detectors, these solutions can be problematic. In one aspect, the detector and/or the target (e.g., the stage) can be moved to enlarge the effective size of the detector. However, movement of the detector and/or target can lengthen the time necessary to complete a CT inspection. Lengthening CT inspection time can be undesirable when CT inspection equipment is in high demand. In another aspect, detectors with larger dimensions can be employed. However, larger detectors can be more costly than smaller counterparts.

In general, improved systems and methods are provided for CT inspection which overcome one or more of these deficiencies. Such systems and methods can employ at least two detectors simultaneously to extend the CT measurement area for inspecting large targets and/or targets exhibiting large projections. This approach can be useful to save time under circumstances where a larger detector is not available or an available larger detector is too expensive or not qualified for the employed penetrating radiation (e.g., cannot measure at least a portion of the energy of the penetrating radiation). Time savings can result from avoiding delays due to movement of a single detector or the target to extend the measurement area. The measurement area can be further extended by employing additional detectors simultaneously (e.g., three or more detectors). In certain embodiments, the penetrating radiation can be emitted in one dimension (e.g., a line or point), in two dimensions (e.g., a fan), or in a three-dimensions (e.g., a cone). The detectors can adopt a variety of positions, depending upon the geometry of the penetrating radiation (e.g., an opening cone angle of three-dimensional penetrating radiation).

In an embodiment, a system is provided and the system can include a stage, a plurality of stationary radiation detectors, and a stationary radiation source. The stage can be configured to secure a target thereon and to rotate the target about a rotation axis. Each of the plurality of stationary radiation detectors can include a sensing face configured to acquire measurements of penetrating radiation incident thereon as a function of position. The sensing faces of adjacent radiation detectors can be separated by a predetermined gap. The stationary radiation source can be configured to emit a beam of penetrating radiation from a focal point. The plurality of stationary radiation detectors and the radiation source can be positioned with respect to the stage and configured to emit the beam such that a first plurality of beam segment paths can be defined between the focal point and respective sensing faces of the plurality of radiation detectors and at least one second beam segment path can be defined between the focal point and the predetermined gap.

In another embodiment, the plurality of radiation detectors can be positioned with respect to the target and the radiation source such that the first plurality of beam segment paths extends through more than one half of a cross-sectional area of the target within a predetermined measurement plane.

In another embodiment, the plurality of radiation detectors can be positioned with respect to the target and the radiation source such that the central axis of respective ones of the first plurality of beam segment paths can be offset from the rotation axis.

In another embodiment, a first beam segment path of the first plurality of beam segment paths can be a right cone and a second beam segment path of the first plurality of beam segment paths can be an oblique cone.

In another embodiment, respective sensing faces of at least two of the plurality of radiation detectors can be co-planar.

In another embodiment, a first sensing face of a first radiation detector of the plurality of radiation detectors can be aligned with a first detector plane and a second sensing face of a second radiation detector of the plurality of radiation detectors can be aligned with a second detector plane. The first and second detector planes can be approximately parallel and laterally offset from one another by a predetermined offset distance.

In another embodiment, a first surface normal extending from a centroid of the sensing surface of at least one radiation detector of the plurality of radiation detectors can be oriented at a predetermined non-zero angle to a second surface normal extending from a plane containing the focal point of the radiation source.

In another embodiment, the plurality of radiation detectors can include a first radiation detector and a second radiation detector. A first surface normal extending from the first sensing face can be parallel to a first radial vector extending from the focal point to a centroid of the first sensing face and a second surface normal extending from the second sensing face can be parallel to a second radial vector extending from the focal point to a centroid of the second sensing face.

In another embodiment, a length of the first radial vector can be equal to a length of the second radial vector.

In another embodiment, a length of the first radial vector can be different from a length of the second radial vector.

In another embodiment, a method for non-destructive testing by computed tomography is provided. The method can include emitting, from a focal point of a stationary radiation source, a beam of penetrating radiation. The method can also include directing the emitted radiation beam in a beam path extending from the focal point, through a portion of a target, and incident upon respective sensing faces of a plurality of stationary radiation detectors. The plurality of stationary radiation detectors can be positioned with respect to the stationary radiation source and the target such that the emitted radiation beam defines a first plurality of beam segment paths extending between the focal point and the sensing faces of the plurality of stationary radiation detectors and at least one second beam segment path extending between the focal point and the predetermined gap. The method can further include outputting, by each of the plurality of stationary radiation detectors, respective signals including data characterizing an intensity of the penetrating radiation incident upon its sensing face as a function of position.

In another embodiment, the plurality of radiation detectors can be positioned with respect to the target and the radiation source such that the central axis of respective ones of the first plurality of beam segment paths can be offset from the rotation axis.

In another embodiment, the first plurality of beam segment paths can be transmitted through more than one half of a cross-sectional area of the target within a predetermined measurement plane.

In another embodiment, the first plurality of beam segment paths can be transmitted through an entirety of a cross-sectional area of the target within a predetermined measurement plane after a single rotation of the target.

In another embodiment, a first beam segment path of the first plurality of beam segment paths can be a right cone and a second beam segment path of the first plurality of beam segment paths can be an oblique cone.

In another embodiment, respective sensing faces of at least two of the plurality of radiation detectors can be co-planar.

In another embodiment, a first sensing face of a first radiation detector of the plurality of radiation detectors can be aligned with a first detector plane and a second sensing face of a second radiation detector of the plurality of radiation detectors can be aligned with a second detector plane. The first and second detector planes can be parallel and laterally offset from one another by a predetermined offset distance.

In another embodiment, a first surface normal extending from a centroid of the sensing surface of at least one radiation detector of the plurality of radiation detectors can be oriented at a predetermined non-zero angle to a second surface normal extending from a plane containing the focal point of the radiation source.

In another embodiment, the plurality of radiation detectors can include a first radiation detector and a second radiation detector. A first surface normal extending from the first sensing face can be parallel to a first radial vector extending from the focal point to a centroid of the first sensing face and a second surface normal extending from the second sensing face can be parallel to a second radial vector extending from the focal point to a centroid of the second sensing face.

In another embodiment, a length of the first radial vector can be equal to a length of the second radial vector.

In another embodiment, a length of the first radial vector can be different from a length of the second radial vector.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Computed Tomography (CT) is one example of a non-destructive testing technique that can provide quantitative images of material density through a slice or cross-sections of a target object using radiation beams such as X-rays. These images (e.g., cross-sections) can be combined to produce corresponding three-dimensional representations of the target. However, existing techniques for performing CT can be problematic when the target object, or the projection of the target object, is larger than the detector. In one approach, the detector and/or target can be moved to extend the measurement area. However, this movement can increase the time required to complete a CT scan, which is undesirable when a CT system is in high demand. In another aspect, acquisition of a relatively large detector can be cost-prohibitive. Accordingly, improved systems and methods are provided for CT inspection. Such systems and methods can employ at least two detectors simultaneously to extend the CT measurement area for inspecting large targets. Furthermore, the detectors can be arranged with respect to a radiation source such that an entire cross-section of the target can be measured during a single rotation of the target. This approach can be useful to save time if no larger detector is available or an available larger detector is too expensive or not qualified for the employed penetrating radiation. Time savings can result from avoiding the movement of a single detector to extend the measurement area.

Embodiments of sensing systems and corresponding methods for non-destructive inspection of targets, such as industrial components, by computed tomography are discussed herein. However, embodiments of the disclosure can be employed for imaging any target objects by computed tomography without limit.

Figure 1:
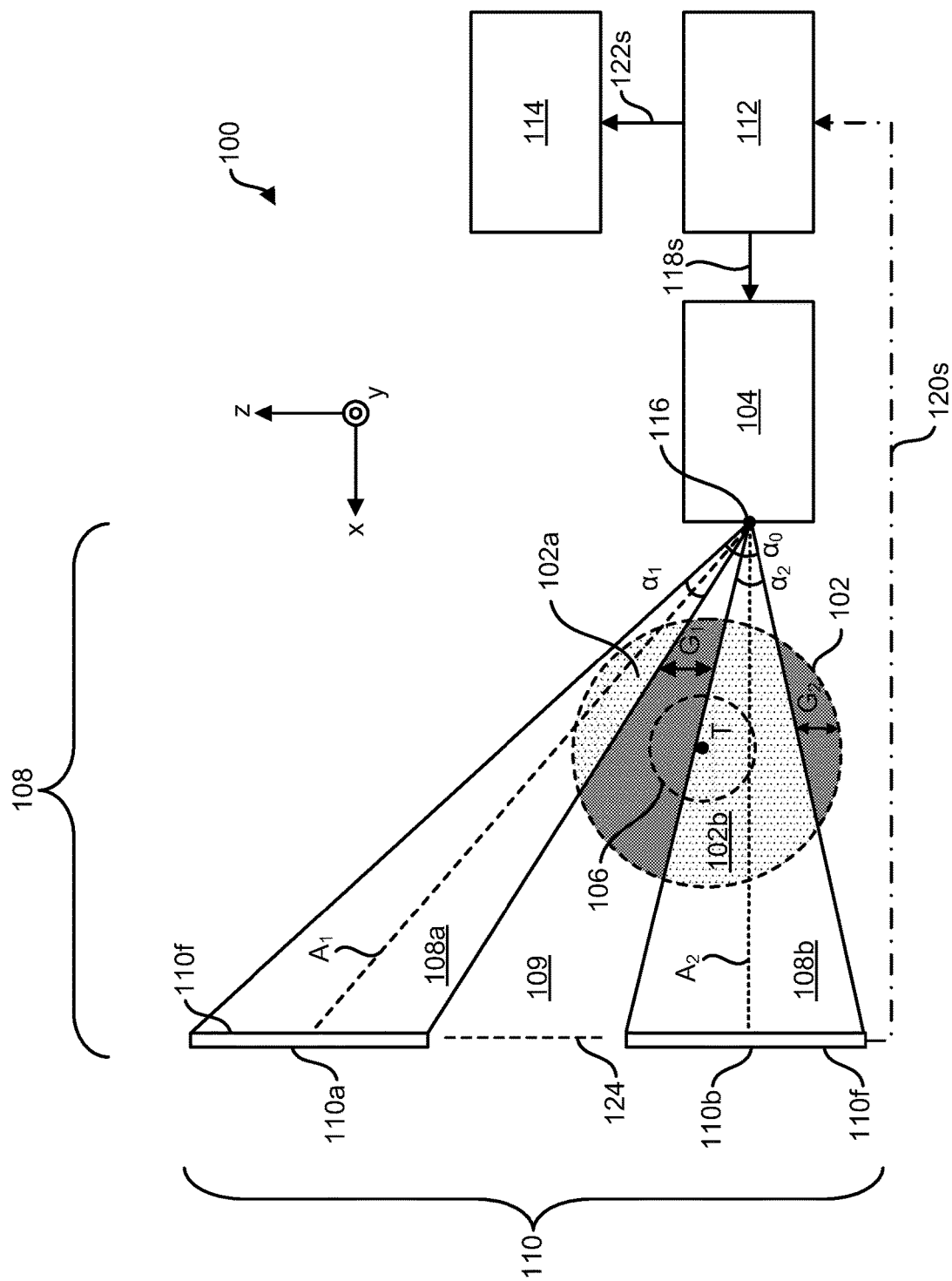
FIG. 1 is a diagram illustrating one exemplary embodiment of an operating environment including a computed tomography (CT) system including a radiation source configured to emit a beam of penetrating radiation for inspection of a target and a plurality of radiation detectors configured to detect the penetrating radiation after transmission through the target.

FIG. 1 illustrates one exemplary embodiment of an operating environment including a computed tomography (CT) system 100 configured to perform non-destructive testing of a target 102. The CT system 100 can include a radiation source 104, a stage 106, a plurality of radiation detectors 110, a controller 112, and an output device 114. One or more electrical power sources (not shown) can be configured to provide electrical power to the CT system 100. The stage 106 can be positioned between the radiation source 104 and the plurality of detectors 110 and it can be configured to secure the target 102 thereon and to rotate the target 102 about a rotation axis T. The radiation source 104 can be configured to emit a radiation beam 108 (e.g., penetrating radiation) from a focal point 116 and to direct the radiation beam 108 incident upon the target 102 for imaging of the target 102. The plurality of detectors 110 can include respective sensing faces 110*f* configured to detect the portion radiation beam 108 that is incident thereon after transmission through the target 102.

In use, the radiation source 104 can be configured to emit the radiation beam 108 in a predetermined geometry (e.g., two-, or three-dimensional geometries) from the focal point 116 in response to command signals 118*s* received from the controller 112. As discussed in detail below, the plurality of detectors 110 can be positioned with respect to the radiation source 104 and one another in a variety of ways. In the embodiment of FIG. 1, the system 100 includes two detectors 110*a*, 110*b* separated by a gap 124. Owing to the gap 124, a first plurality of beam segments of the radiation beam 108 follow respective first beam paths incident upon the plurality of detectors 110. As an example, a first beam segment 108*a* of the radiation beam 108 follows a first path that extends through a first portion 102*a* of the target 102 and is incident upon a first detector 110*a*. Similarly, a second beam segment 108*b* of the radiation beam 108 follows a beam path extending through a second portion of the target 102 and is incident upon a second detector 110*b*. Additionally, at least one second beam segment path 109 is defined between the focal point 116 and the predetermined gap 124 (e.g., by opposing edges of adjacent ones of the plurality of detectors 110).

Beneficially, by employing two or more radiation detectors 110 simultaneously (e.g., in parallel operation) during a CT inspection process, multiple portions of the target 102 (e.g., 102*a*, 102*b*) can be inspected at the same time. By rotating the target 102, other portions of the target 102 can be inspected as well. In this manner, CT inspection of large targets and/or target projections can be performed more quickly than alternative approaches employing movement of a single radiation detector.

Embodiments of the target 102 can be any structure and/or material that is suitable for inspection using the radiation beam 108. As an example, the target 102 can allow transmission of the radiation beam 108 with sufficient radiant intensity (electromagnetic energy per unit time per unit solid beam angle) for detection by the plurality of detectors 110. Examples of target structures can include castings, vehicle parts (e.g., automobiles, aircraft, watercraft, etc.). Examples of materials forming the target 102 can include metals, metal alloys, ceramics, polymers, stone, and composites thereof. While the target 102 is illustrated herein as possessing a circular cross-section (e.g., perpendicular to the rotation axis T), it can be understood that embodiments of the target can possess any desired cross-sectional area.

The stage 106 can be configured to secure the target 102 thereto via a securing mechanism (not shown). The securing mechanism can be integrated within the stage 106 and/or deployed in combination with the stage 106. Examples of the securing mechanism can include adhesives, clamps, straps, threaded components (e.g., screws, bolts), and the like. The stage 106 can be in further configured to selectively rotate the target 102 to a desired rotation angle about the rotation axis T in response to commands (e.g., command signals 118*s*) received from the controller 112.

Embodiments of the radiation source 104 can be any device capable of generating and directing a beam of penetrating radiation through selected cross-sections of the target 102. Examples of the penetrating radiation can possess energy up to about 15 MeV (e.g., about 100 eV to about 15 MeV.

In certain embodiments, the controller 112 can be in communication with the radiation source 104 and the stage 106 for control of characteristics (e.g., frequency, amplitude, intensity, geometry etc.) of the radiation beam 108 and rotation of the target 102 by the stage 106 (e.g., in response to operator input). The controller 112 can be any computing device employing a general purpose or application specific processor. In either case, the controller 112 can also include a memory (not shown) for storing instructions related to control of the radiation beam 108 and rotation of the target 102.

In certain embodiments, the radiation beam 108 can possess a two-dimensional or three-dimensional geometry. Examples of two-dimensional geometries can include fan beams. Examples of three-dimensional geometries can include conic geometries (e.g., right cones, oblique cones, and combinations thereof). In either case, as illustrated in FIG. 1, the radiation beam 108 can extend from the focal point 116 to the plurality of detectors 110 and possess a beam angle $\alpha_o$. As an example, a beam segment path 108a incident upon the first detector 110a can have a beam angle $\alpha_1$ and it can extend about a central axis $A_1$. A second beam segment path 108b incident upon the second detector 110b can have a beam angle $\alpha_2$ and it can extend about a central axis $A_2$. In general, a central axis of a radiation beam can be a line segment extending from the focal point 116 to the center (e.g., a geometric center or centroid) of the sensing face 110f of a corresponding radiation detector (e.g., 110a or 110b).

In certain embodiments, the plurality of detectors 110 and the beam angles $\alpha_1$, $\alpha_2$ can be selected such that the central axis of each of the beam segment paths 108a, 108b (e.g., $A_1$, $A_2$) is offset from the rotation axis T of the target 102. As an example, the central axes $A_1$ and $A_2$ of the beam segment paths 108a, 108b, respectively, can extend along respective lines that do not intersect the rotation axis T. In general, should the central axis of any of the first plurality of beam segment paths intersect the rotation axis T, reconstruction quality can be strongly distorted in these regions, in particular, the quantitative values.

As further illustrated, adjacent ones of the first plurality of beam segment paths (e.g., 108a, 108b) are separated by a first gap $G_1$ within the bulk of the target 102 that increases with distance from the focal point 116. That is to say, the first beam segment paths 108a, 108b are divergent. Further, at least one of the first beam segment paths (e.g., 108b) is separated from a portion of the outer surface of the target 102 by a second gap $G_2$. As such, each of the beam segment paths 108a, 108b do not overlap and can inspect a different cross-section of the target 102 (e.g., 102a, 102b).

Each of the plurality of radiation detectors 110 can be configured to detect flux density, also referred to as intensity, of penetrating radiation incident upon its sensing face 110f as a function of position within the sensing face 110f. Examples of the radiation detectors 110 can include gas ionization detectors, scintillation counter detectors, photo-stimulatable phosphor plates, photographic plates, semiconductor detectors (e.g., charge coupled devices or CCD), and the like. In certain embodiments, the sensing face 110f of each of the plurality of detectors 110 can adopt a predetermined geometry. As shown in FIG. 1, each of the plurality of radiation detectors 110 can include a sensing face 110f that is approximately planar. However, in alternative embodiments, the geometry of the sensing face of one or more of the plurality of radiation detectors can be independently selected to be different than others of the plurality of radiation detectors.

Each of the plurality of radiation detectors 110 can also be configured to output a detection signal 120s including data characterizing radiation intensity as a function of position incident upon the sensing face 110f. The controller 112 can store instructions for determining quantitative maps of material density or a related quantity at each location within the inspected cross-sections of the target 102 based upon respective detection signals 120s received from the plurality of detectors 110 and knowledge of the emitted intensity of the radiation beam 108 (e.g., prior to transmission through the target 102).

In response to commands received from the controller 112 (not shown), the stage 106 can rotate the target 102 about the axis of rotation T to a predetermined angle with respect to a reference angle. As a result, the first plurality of beam segment paths 108a, 108b can be transmitted through different cross-sections of the target 102 (e.g., 102a, 102b) for detection by the plurality of detectors 110. The process of emitting the radiation beam 108 by the radiation source 104, detection of the radiation beam 108 incident upon the plurality of detectors 110 after transmission through the target 102, and rotation of the target 102 by the stage 106 can be repeated as many times as necessary to inspect a desired volume of the target 102.

In certain embodiments, radiation beam 108, the position of the plurality of radiation detectors 110, and the rotation of the target 102 can be configured to facilitate transmission of the plurality of radiation beams 108 through cross-sections representing the entire volume of the target 102, within one revolution of the target 102 about the rotation axis T. In one aspect, the angle $\alpha_o$ can be selected such that the beam 108 covers each of the plurality of detectors 110. In another aspect, the gap 124 can be selected such that the first plurality of beam segment paths 108a, 108b extend through more than one half of a cross-sectional area of the target 102, the target cross-sectional area lying within a predetermined measurement plane. As shown, the predetermined measurement plane is the x-z plane, where the rotation axis extends parallel to the y-direction. Stated another way, by selecting the gap 109 such that the Fourier slice theorem is fulfilled in the two-dimensional fan beam case and fulfilled in the cross-sectional area of the target 102 (e.g., the x-z plane) for the three-dimensional (conic) beam case, the target 102 can be inspected in a single rotation. One skilled in the art will appreciate that the requirement of the Fourier slice theorem is from the theoretical perspective. Practically, the condition can be weakened with quality and approximation decrease. Additionally, the Fourier slice theorem criteria can be weakened for non-analytical reconstruction methods (e.g., iterative methods).

The memory of the controller 112 can also store instructions related to reconstructing the volume of the target 102 according to one or more reconstruction techniques based upon the angle of rotation of the target and the corresponding detection signals received from the plurality of detectors. Examples of reconstruction techniques can include iterative and analytical algorithms. Cross-sections can be analyzed separately and then combined to form the three-dimensional volume of the target or the cross-sections can be rebinned/combined into a rotary data set. In certain embodiments, such data sets can be incomplete in relation to the Tuy-Smith sufficiency condition. In particular, iterative algorithms can be configured to handle incomplete data sets. In alternative embodiments, not shown, the plurality of radiation detectors can be configured to transmit the detection signals to an alternative computing device different from the controller for reconstruction of the target cross-sections and/or target volume, as discussed above.

The controller 112, or the alternative computing device, can also be configured to transmit one or more output signals 122s including data characterizing the inspected target cross-sections and/or reconstructed target volumes to the output device 114. As an example, the controller 112 can output the material density or related quantity as a function of position. In certain embodiments, the output device can be a display and/or a data storage device.

In certain embodiments, the radiation source 104 and the plurality of detectors 110 can be stationary. That is, the radiation source 104 and the plurality of detectors 110 can exhibit approximate no movement (e.g., remaining in a fixed position with respect to the rotation axis T of the target 102 and/or each other) during CT inspection but can be moved for setup of a desired scan geometry prior to conducting CT inspection. Beneficially, as discussed above, in combination with the configuration of the radiation beam 108 and the location of the plurality of detectors 110, the stationary plurality of detectors 110 can allow inspection of the entire volume of the target 102. By omitting motion of the plurality of detectors 110 and/or the radiation source 104 during the CT inspection process, the time of inspection of large targets or large target projections can be reduced.

FIGS. 1-7 further illustrate a variety of configurations for placement of each of the plurality of radiation detectors 110 with respect to one another and the radiation source 104. In one embodiment, the sensing faces 110f of each of the plurality of detectors 110 can be parallel to one another. As shown in FIG. 1, the first radiation detector 110a and the second radiation detector 110b can each include sensing faces 110f that are planar. Each of the first and second sensing faces 110f can be approximately co-planar, aligned with a common plane 124.

Figure 2:
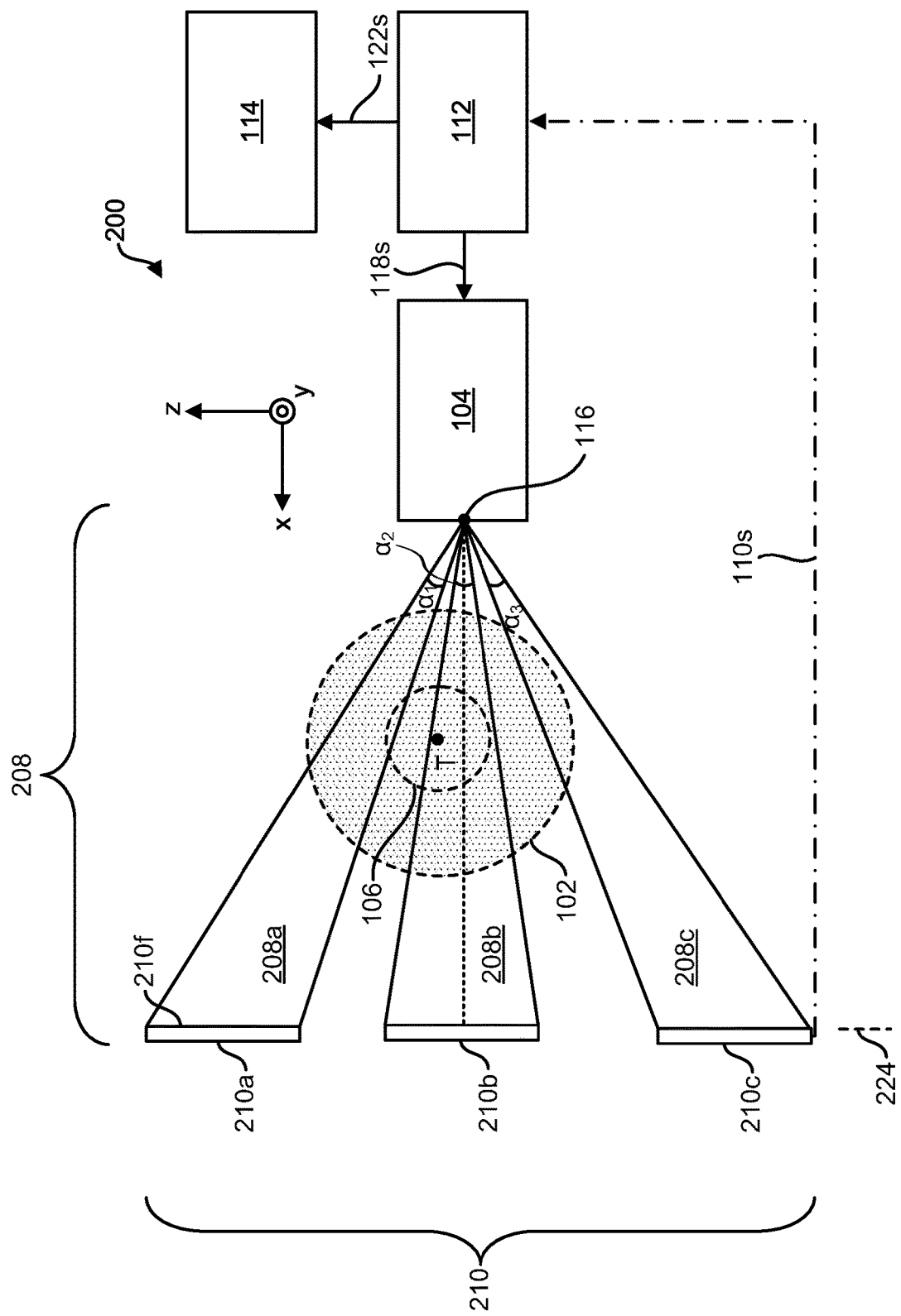
FIG. 2 is a diagram illustrating another exemplary embodiment of the CT system of FIG. 1 including three radiation detectors configured to detect the penetrating radiation after transmission through the target.

This co-planar arrangement of the plurality of radiation detectors 110 can be maintained as additional radiation detectors are added. As an example, FIG. 2 illustrates another operating environment including a CT inspection system 200 having the plurality of radiation detectors 110 in the form of a plurality of radiation detectors 210. As shown, the plurality of radiation detectors 210 includes first and second radiation detectors 210a, 210b and further adds a third radiation detector 210c. Each of the first, second and third radiation detectors 210a, 210b, 210c can include respective sensing faces 210f configured to detect portions of a radiation beam 208 incident thereon (e.g., portions of the radiation beam 208 following beam segment paths 208a, 208b, 208c and having beam angles $\alpha_1$, $\alpha_2$, $\alpha_3$, respectively). The first, second, and third radiation detectors 210a, 210b, 210c can be positioned such that they are each aligned with a common plane 224 and are thus approximately co-planar with each other.

In certain embodiments, any two or more of the plurality of radiation detectors 110 can be considered approximately co-planar when an angle between surface normals of their respective sensing faces 110f is less than a pre-determined first angular tolerance and a distance separating the planes containing the respective sensing faces 110f is less than a predetermined linear tolerance.

Figure 3:
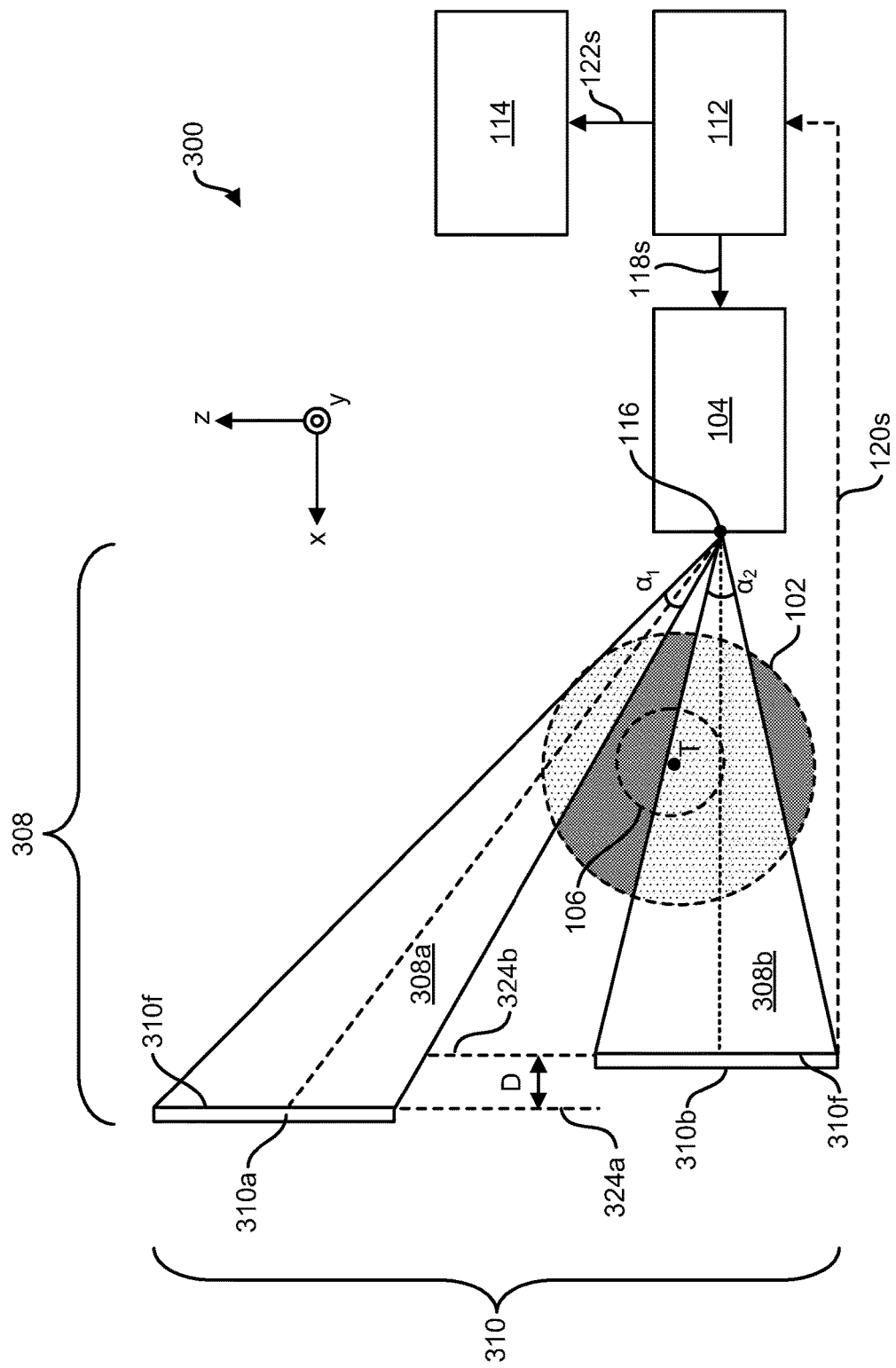
FIG. 3 is a diagram illustrating another exemplary embodiment of the CT system of FIG. 1 including two radiation detectors that are positioned in different planes with respect to one another.

In an alternative embodiment, one or more of the plurality of radiation detectors 110 can be approximately parallel to one another but offset in one or more predetermined directions. As an example, FIG. 3 illustrates another operating environment including a CT inspection system 300 including the plurality of radiation detectors 110 in the form of a plurality of radiation detectors 310. As shown, the plurality of radiation detectors 310 includes first and second radiation detectors 310a, 310b with respective sensing faces 310f configured to detect portions of a radiation beam 308 thereon (e.g., portions of the radiation beam 308 following beam segment paths 308a, 308b and having beam angles $\alpha_1$, $\alpha_2$, respectively). The sensing face 310f of the first radiation detector 310a is aligned with a first plane 324a and the sensing face 310f of the second radiation detector 310b is aligned with a second plane 324b. The first and second planes 324a, 324b are approximately parallel but not co-planar. Instead, the first and second planes 324a, 324b are separated from one another in the x-direction by an offset distance D greater than the predetermined linear tolerance. In certain embodiments, a minimum of the offset distance D can be the smallest offset distance D at which the plurality of radiation detectors 110 do not touch the target 102 during rotation and a maximum of the offset distance D can be the largest offset distance D at which quantum energy reaching a given one of the plurality of radiation detectors 110 is detectable.

Figure 4:
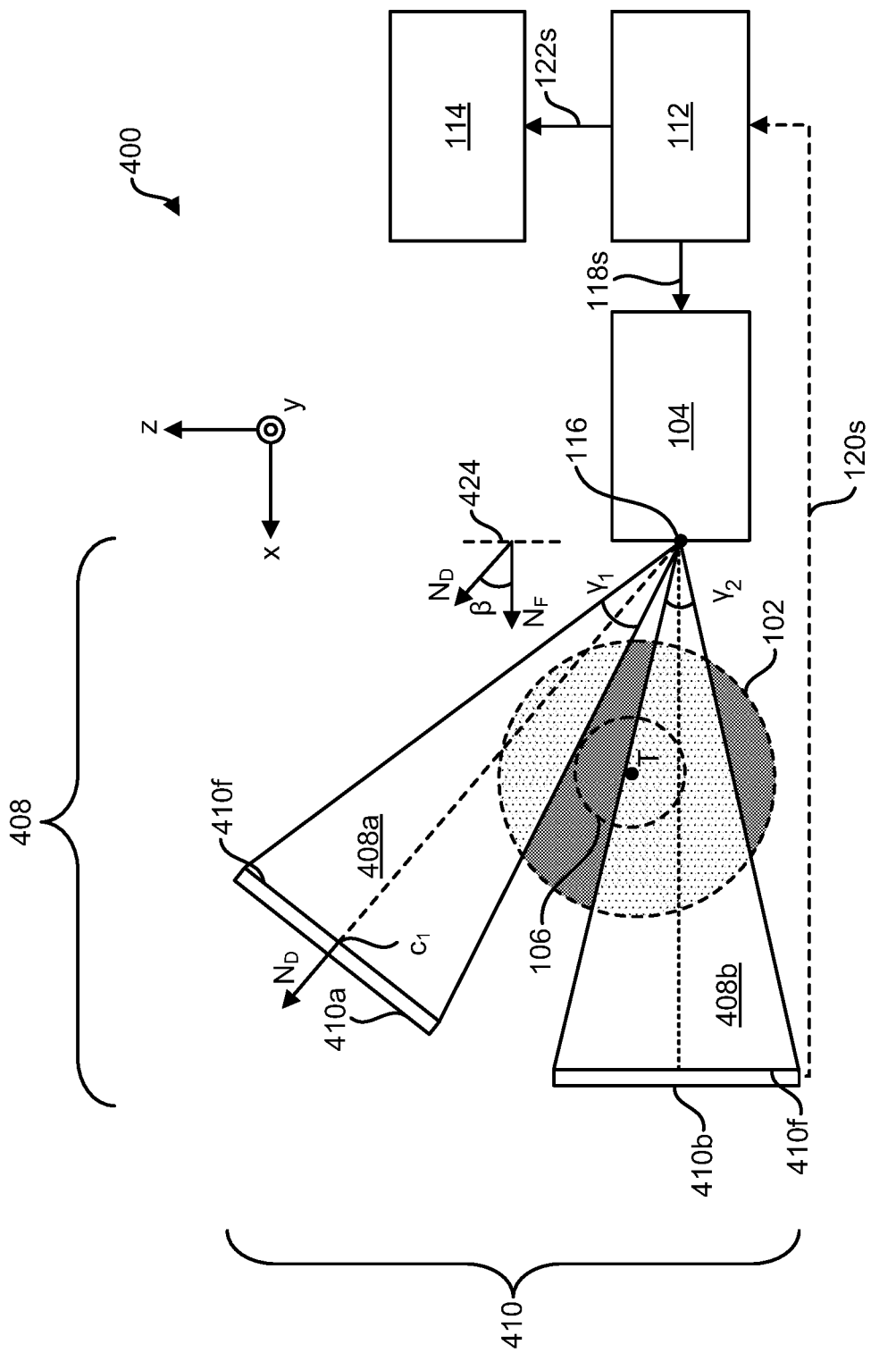
FIG. 4 is a diagram illustrating another exemplary embodiment of the CT system of FIG. 1 including a radiation detector positioned at a non-zero angle with respect to the radiation source.

In another embodiment, at least one of the plurality of radiation detectors 110 can be oriented at a predetermined non-zero angle $\beta$ with respect to the radiation source 104. Such an orientation can achieve better usage of angle segments and radiation. As an example, FIG. 4 illustrates another operating environment including a CT inspection system 400 including the plurality of radiation detectors 110 in the form of a plurality of radiation detectors 410. As shown, the plurality of radiation detectors 410 includes first and second radiation detectors 410a, 410b with respective sensing faces 410f configured to detect portions of radiation beam 408 incident thereon (e.g., portions of the radiation beam 408 following beam segment paths 408a, 408b and having beam angles $\gamma_1$, $\gamma_2$, respectively). As shown in FIG. 4, the angle $\beta$ can be determined between a surface normal $N_D$ to the sensing face 410f of the first radiation detector 410a and a surface normal $N_F$ to a predetermined plane 424 containing the focal point 116.

Figure 5:
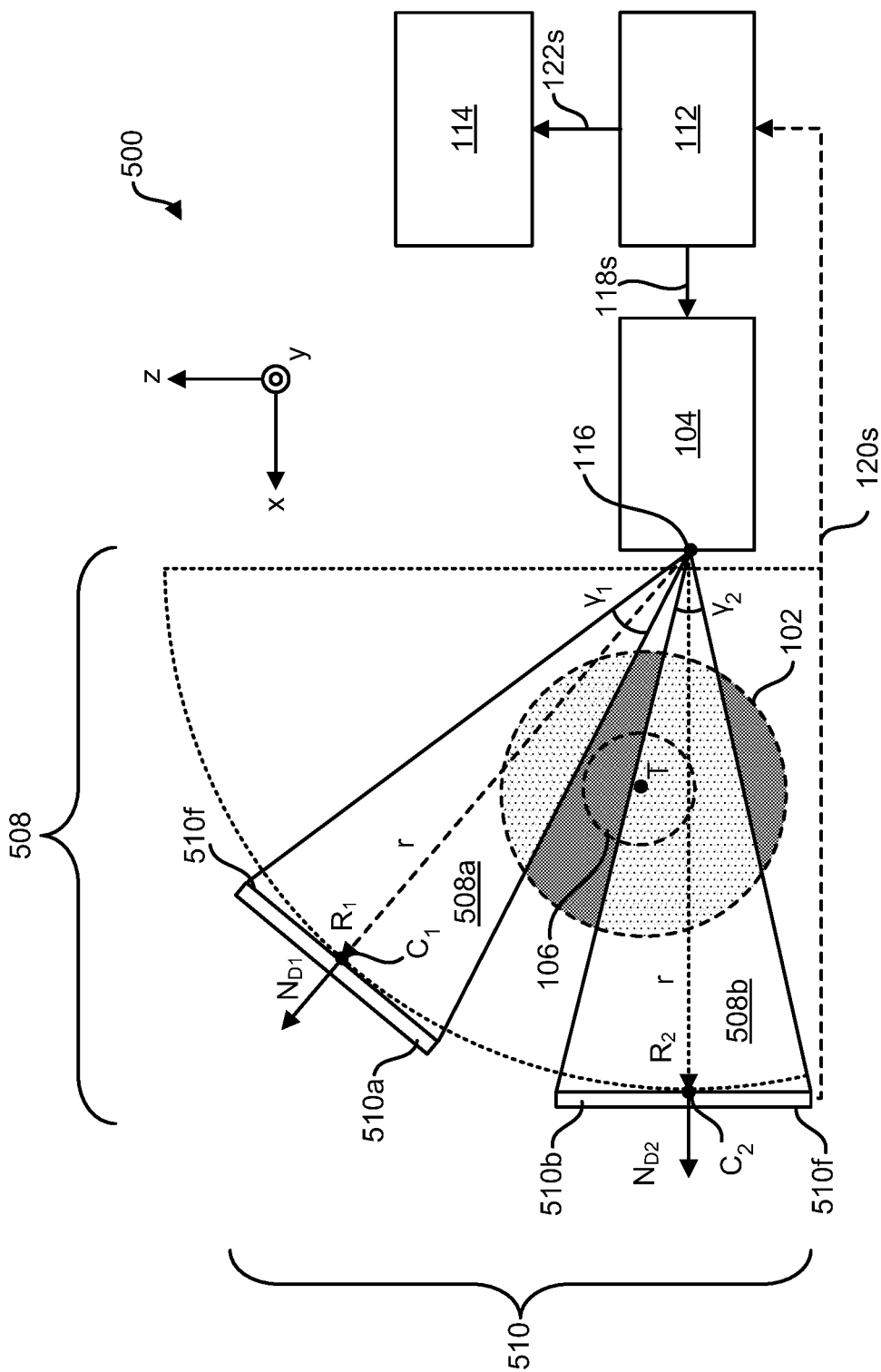
FIG. 5 is a diagram illustrating another exemplary embodiment of the CT system of FIG. 1 including a plurality of radiation detectors oriented such that a normal vector to each sensing surface is approximately parallel to a radius vector extending from the focal point of the radiation source.

In another embodiment, at least one radiation detector of the plurality of radiation detectors 110 can be positioned with respect to a radius vector R extending from the focal point 116 of the radiation source 104. As an example, FIG. 5 illustrates another operating environment including a CT inspection system 500 including the plurality of radiation detectors 110 in the form of a plurality of radiation detectors 510. As shown, the plurality of radiation detectors 510 includes first and second radiation detectors 510a, 510b with respective sensing faces 510f configured to detect portions of a radiation beam 508 incident thereon (e.g., portions of the radiation beam 508 following beam segment paths 508a, 508b and having beam angles $\gamma_1$, $\gamma_2$, respectively). A first surface normal $N_{D1}$ extends from a centroid $C_1$ of the sensing face 510f of the first radiation detector 510a and a second surface normal $N_{D2}$ extends from a centroid $C_2$ of the sensing face 510f of the second radiation detector 510b. Further illustrated are radial vectors $R_1$ and $R_2$ of length r extending from the focal point 116 to respective centroids $C_1$ and $C_2$. In one aspect, at least the first radiation detector 510a can be positioned such that the first surface normal $N_{D1}$ is approximately parallel to the radius vector $R_1$. In another aspect, both the first radiation detector 510a and the second radiation detector 510b can be positioned such that the first surface normal $N_{D1}$ is approximately parallel to the first radius vector $R_1$ and the second surface normal is approximately parallel to the radius vector $R_2$. In certain embodiments, any surface normal and radius vector can be considered parallel when an angle therebetween is less than a pre-determined second angular tolerance.

In an embodiment, at least one radiation detector 110 can be positioned such that a predetermined location of the sensing surface 110f is located at a predetermined distance from the focal point 116. In certain embodiments, the predetermined location can be a centroid of the sensing surface 110f, the arithmetic mean position of all points of the sensing surface 110f. In further embodiments, the predetermined distance can be a radial distance from the focal point 116. As shown in the embodiment of FIG. 5, the sensing surface 510f of the first radiation detector 510a has a centroid $C_1$ and the sensing surface 510f of the second radiation detector 510b has a centroid $C_2$, and each of the centroids $C_1$ and $C_2$ are positioned at a common radial distance r. That is, the length of each of the radial vectors $R_1$ and $R_2$ is approximately equal.

In certain embodiments, the radial vectors $R_1$ and $R_2$ can be considered approximately equal when the difference in their respective lengths is less than a predetermined linear tolerance.

Figure 6:
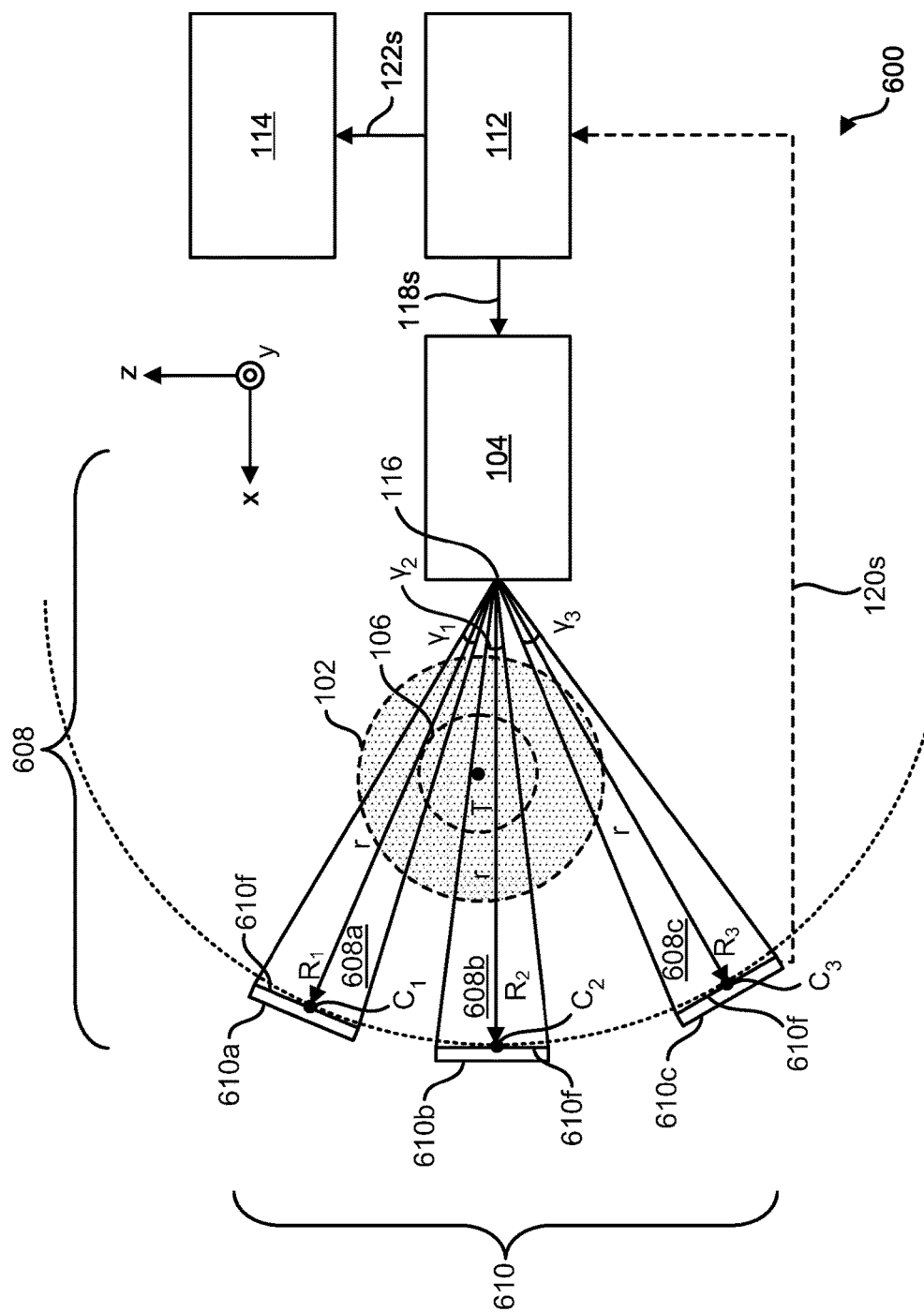
FIG. 6 is a diagram illustrating another exemplary embodiment of the CT system of FIG. 1 including three radiation detectors including respective sensing faces that are positioned at a common radius r with respect to a focal point of the radiation source.

This radial arrangement of the plurality of radiation detectors 510 can be maintained as additional radiation detectors are added. As an example, FIG. 6 illustrates another operating environment including a CT inspection system 600 including the plurality of radiation detectors 110 in the form of a plurality of radiation detectors 610. As shown, the plurality of radiation detectors 610 includes first and second radiation detectors 610a, 610b and further adds a third radiation detector 610c. Each of the first, second and third radiation detectors 610a, 610b, 610c can include respective sensing faces 610f with centroids $C_1$, $C_2$, and $C_3$, respectively. The sensing faces 610f can be configured to detect portions of a radiation beam 608 incident thereon (e.g., portions of the radiation beam 608 following beam segment paths 608a, 608b, 608c and having beam angles $\gamma_1$, $\gamma_2$, and $\gamma_3$, respectively). A third radial vector $R_3$ further illustrated having the same radial length r as the first and second radial vectors. As shown, each of the first, second and third radiation detectors 610a, 610b, 610c can be positioned such that the centroids $C_1$, $C_2$, and $C_3$ are positioned at the radial distance r.

Figure 7:
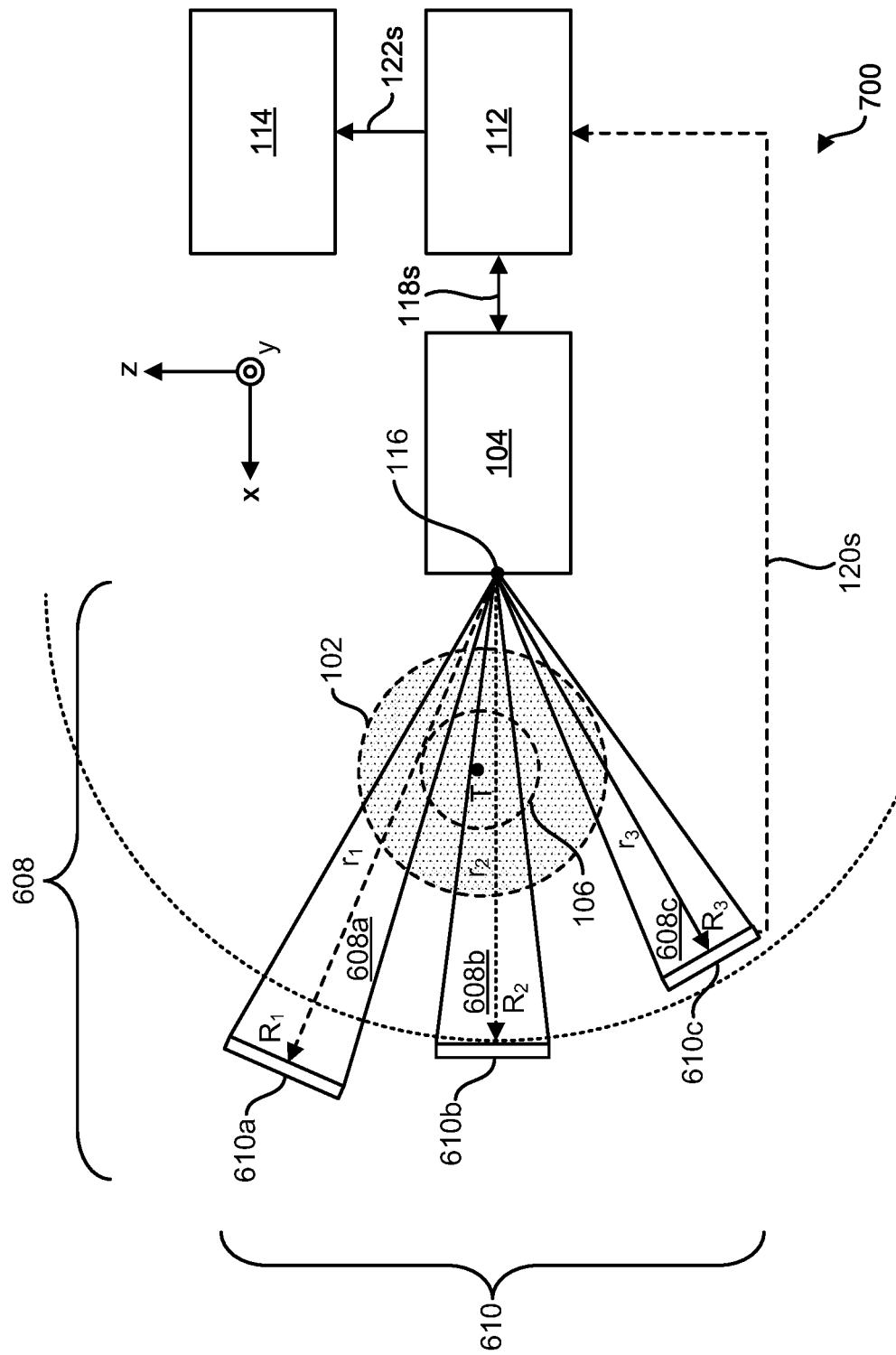
FIG. 7 is a diagram illustrating another exemplary embodiment of the CT system of FIG. 5 including three radiation detectors including respective sensing faces that are positioned at different radii $r_1$, $r_2$, and $r_3$ with respect to a focal point of the radiation source.

In an alternative embodiment, one or more of the plurality of radiation detectors 610 can be positioned at different radial distances. FIG. 7 illustrates another operating environment including a CT inspection system 700 including each of the first, second, and third radiation detectors 610a, 610b, 610c and radial vectors $R_1$, $R_2$, and $R_3$ having different radial lengths $r_1$, $r_2$, and $r_3$, respectively, with $r_1 > r_2 > r_3$. The first, second, and third radiation detectors 610a, 610b, 610c can be positioned such that their respective centroids $C_1$, $C_2$, and $C_3$ are positioned at the radial distances $r_1$, $r_2$, and $r_3$, respectively.

Figure 8:
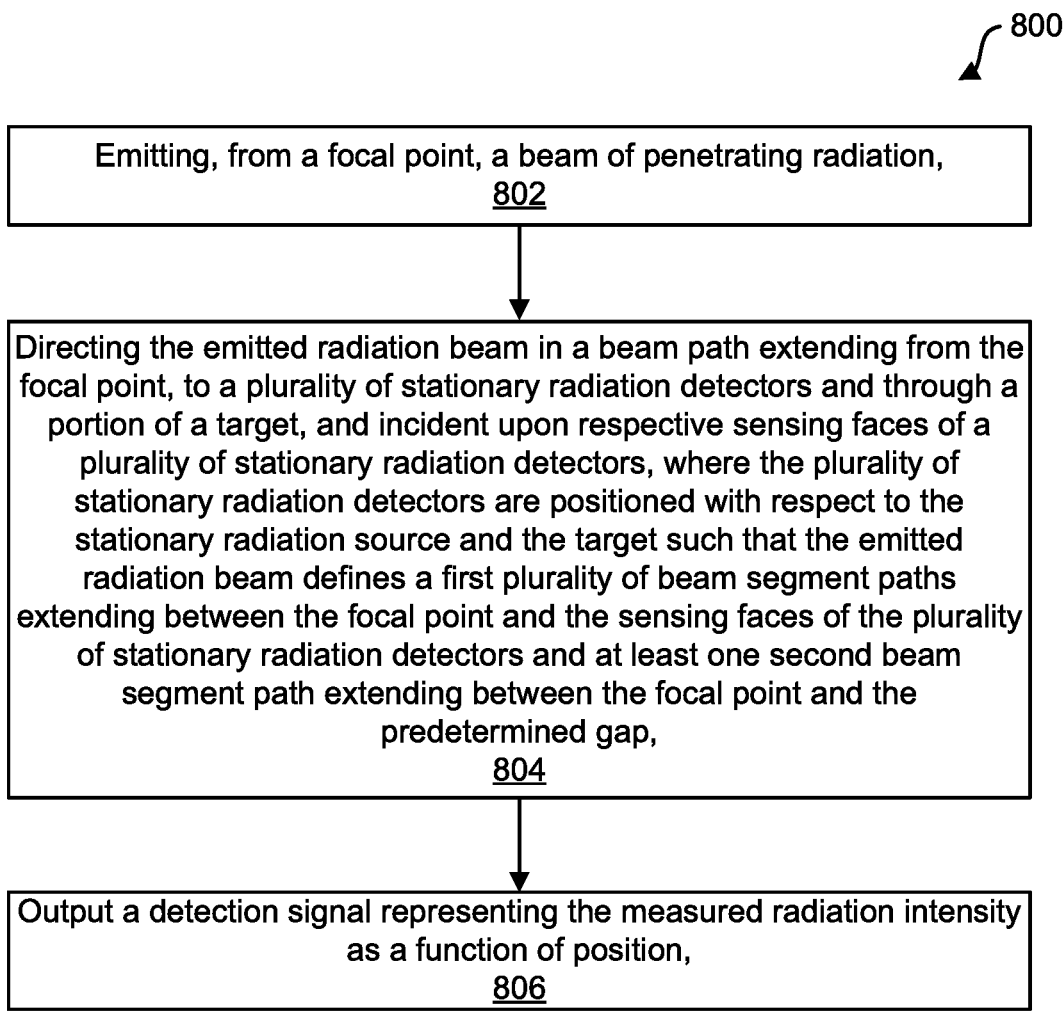
FIG. 8 is a flow diagram illustrating one exemplary embodiment of a method for CT inspection of a target employing two or more detectors.

FIG. 8 illustrates one embodiment of a method 800 for performing CT inspection. As shown, the method 800 can include operations 802-806 and is discussed below in the context of FIGS. 1-7. However, it can be understood that embodiments of the method can include greater or fewer operations than illustrated in FIG. 8 and one or more operations can be performed in an order different than that illustrated in FIG. 8.

In operation 802, the beam 108 of penetrating radiation can be emitted from the radiation source 104. As discussed above, the radiation source 104 can be a stationary radiation source with respect to the target 102 and the plurality of detectors 110.

In operation 804, the emitted radiation beam can be directed in a beam path extending from the focal point 116 of the radiation source, through a portion of the target 102, and incident upon respective sensing faces (e.g., 1100 of a plurality of stationary radiation detectors (e.g., 110). The plurality of stationary radiation detectors can be positioned with respect to the stationary radiation source and the target such that the emitted radiation beam defines a first plurality of beam segment paths extending between the focal point and the sensing faces of the plurality of radiation detectors and at least one second beam segment path extending between the focal point and the predetermined gap In operation 806, each of the plurality of detectors can output respective signals. As an example, respective sensing faces 110f of the plurality of radiation detectors 110 can measure radiation intensity as a function of position for portions of the radiation beam 108 (e.g., 108a, 108b) transmitted through the target 102 and incident thereon. Each of the plurality of radiation detectors 110 can be configured to output one or more signals including data characterizing an intensity of the penetrating radiation incident upon its sensing face as a function of position. (e.g., detection signals 120s). That is, the plurality of stationary radiation detectors can be two-dimensional radiation detectors. In certain embodiments, the one or more detection signals 120s can be output to the controller 112 for further analysis.

Exemplary technical effects of the methods, systems, and devices described herein include, by way of non-limiting example, the ability to perform CT inspection of large targets or targets exhibiting large target projection (e.g., targets or target projections greater than twice a width of a sensitive area of respective ones of the plurality of radiation detectors). Compared to traditional stitching methods employing a single virtual detector having sensitive and insensitive regions, CT inspection can be performed faster. Improving CT inspection speed can facilitate better utilization of expensive and limited inspection resources (e.g., radiation shielded rooms, radiation sources, etc.) In another aspect, the improved CT inspection speed can be achieved without the need for a motion apparatus to move a detector, as compared to a virtual detector.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system, comprising:
a stage configured to secure a target thereon and to rotate the target about a rotation axis;
a plurality of stationary radiation detectors, each radiation detector including a sensing face configured to acquire measurements of penetrating radiation incident thereon as a function of position, wherein the sensing faces of adjacent radiation detectors are separated by a predetermined gap; and
a stationary radiation source configured to emit a beam of penetrating radiation from a focal point, wherein the plurality of stationary radiation detectors and the radiation source are positioned with respect to the stage and configured to emit the beam such that a first plurality of beam segment paths is defined between the focal point and respective sensing faces of the plurality of radiation detectors and at least one second beam segment path is defined between the focal point and the predetermined gap;
wherein the plurality of radiation detectors are positioned with respect to the target and the radiation source such that the first plurality of beam segment paths extends through more than one half of a cross-sectional area of the target within a predetermined measurement plane.

2. The system of claim 1, wherein the plurality of radiation detectors are positioned with respect to the target and the radiation source such that the central axis of respective ones of the first plurality of beam segment paths are offset from the rotation axis.

3. The system of claim 1, wherein a first beam segment path of the first plurality of beam segment paths is a right cone and a second beam segment path of the first plurality of beam segment paths is an oblique cone.

4. The system of claim 1, wherein respective sensing faces of at least two of the plurality of radiation detectors are co-planar.

5. The system of claim 1, wherein a first sensing face of a first radiation detector of the plurality of radiation detectors is aligned with a first detector plane and a second sensing face of a second radiation detector of the plurality of radiation detectors is aligned with a second detector plane, wherein the first and second detector planes are approximately parallel and laterally offset from one another by a predetermined offset distance.

6. The system of claim 1, wherein a first surface normal extending from a centroid of the sensing surface of at least one radiation detector of the plurality of radiation detectors is oriented at a predetermined non-zero angle to a second surface normal extending from a plane containing the focal point of the radiation source.

7. The system of claim 6, wherein a length of the first radial vector is equal to a length of the second radial vector.

8. The system of claim 6, wherein a length of the first radial vector is different from a length of the second radial vector.

9. The system of claim 1, wherein the plurality of radiation detectors comprises a first radiation detector and a second radiation detector, wherein a first surface normal extending from the first sensing face is parallel to a first radial vector extending from the focal point to a centroid of the first sensing face and a second surface normal extending from the second sensing face is parallel to a second radial vector extending from the focal point to a centroid of the second sensing face.

10. A method, comprising:
emitting, from a focal point of a stationary radiation source, a beam of penetrating radiation;
directing the emitted radiation beam in a beam path extending from the focal point, through a portion of a target, and incident upon respective sensing faces of a plurality of stationary radiation detectors;
wherein the plurality of stationary radiation detectors are positioned with respect to the stationary radiation source and the target such that the emitted radiation beam defines a first plurality of beam segment paths extending between the focal point and the sensing faces of the plurality of stationary radiation detectors and at least one second beam segment path extending between the focal point and the predetermined gap; and
outputting, by each of the plurality of stationary radiation detectors, respective signals including data characterizing an intensity of the penetrating radiation incident upon its sensing face as a function of position,
wherein the first plurality of beam segment paths are transmitted through more than one half of a cross-sectional area of the target within a predetermined measurement plane.

11. The method of claim 10, wherein the plurality of radiation detectors are positioned with respect to the target and the radiation source such that the central axis of respective ones of the first plurality of beam segment paths are offset from the rotation axis.

12. The method of claim 10, wherein the first plurality of beam segment paths are transmitted through an entirety of a cross-sectional area of the target within a predetermined measurement plane after a single rotation of the target.

13. The method of claim 10, wherein a first beam segment path of the first plurality of beam segment paths is a right cone and a second beam segment path of the first plurality of beam segment paths is an oblique cone.

14. The method of claim 10, wherein respective sensing faces of at least two of the plurality of radiation detectors are co-planar.

15. The method of claim 10, wherein a first sensing face of a first radiation detector of the plurality of radiation detectors is aligned with a first detector plane and a second sensing face of a second radiation detector of the plurality of radiation detectors is aligned with a second detector plane, wherein the first and second detector planes are parallel and laterally offset from one another by a predetermined offset distance.

16. The method of claim 10, wherein a first surface normal extending from a centroid of the sensing surface of at least one radiation detector of the plurality of radiation detectors is oriented at a predetermined non-zero angle to a second surface normal extending from a plane containing the focal point of the radiation source.

17. The method of claim 10, wherein the plurality of radiation detectors comprises a first radiation detector and a second radiation detector, wherein a first surface normal extending from the first sensing face is parallel to a first radial vector extending from the focal point to a centroid of the first sensing face and a second surface normal extending from the second sensing face is parallel to a second radial vector extending from the focal point to a centroid of the second sensing face.

18. The method of claim 17, wherein a length of the first radial vector is equal to a length of the second radial vector.

19. The method of claim 17, wherein a length of the first radial vector is different from a length of the second radial vector.

* * * * *